No. 776,688. PATENTED DEC. 6, 1904.
G. F. RICHTER.
NEEDLE HOLDER.
APPLICATION FILED DEC. 26, 1903.
NO MODEL.
Fig. 1.
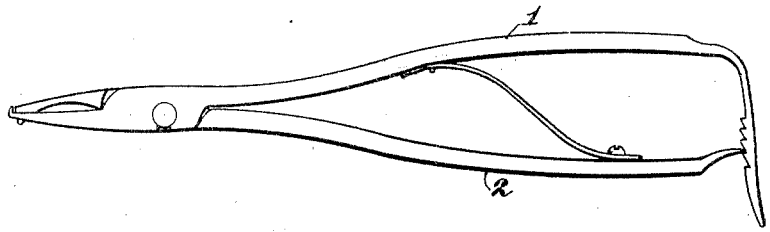
Fig. 2. Fig. 3. Fig. 4.
 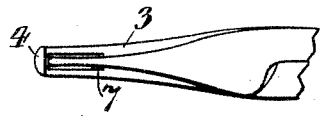 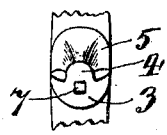
Fig. 5. Fig. 6. Fig. 7.
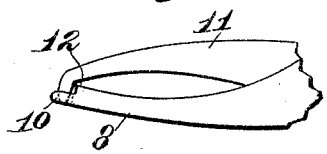 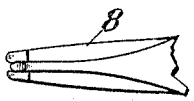 
Fig. 8.
Fig. 9. Fig. 10.
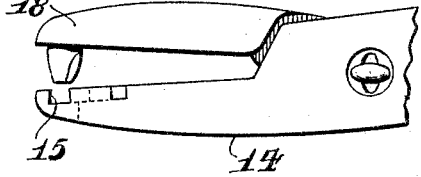 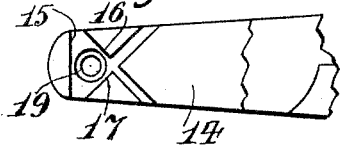
Fig. 12.
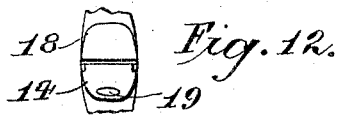
Fig. 11.
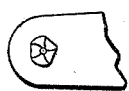
Witnesses
Edgworth Greene
John J. McElhinny
Gustav F. Richter, Inventor
By his Attorney
H. G. Kimball No. 776,688.

Patented December 6, 1904.

UNITED STATES PATENT OFFICE.

GUSTAV F. RICHTER, OF NEW YORK, N. Y.

NEEDLE-HOLDER.

SPECIFICATION forming part of Letters Patent No. 776,688, dated December 6, 1904.

Application filed December 26, 1903. Serial No. 186,533. (No model.)

*To all whom it may concern:*

Be it known that I, GUSTAV F. RICHTER, a citizen of the United States, and a resident of the borough of Brooklyn, city and State of New York, have invented certain new and useful Improvements in Needle-Holders, of which the following is a full, clear, and concise specification.

My invention relates to holders for surgical needles, and more particularly has to do with an improved form of instrument capable of holding needles of various styles and sizes firmly and securely without danger of breaking or distorting them, the object of my invention being the production of a holder fulfilling the above requirements, and which from the principle of its action and the disposition of its strains is enabled to be of slender form without sacrifice of rigidity or strength of grip, thereby producing a holder specially suited for delicate operations and for convenient use in confined and inaccessible quarters.

My invention also involves numerous and other prominent features of advantage over existing instruments, hereinafter fully described, and more particularly pointed out in the appended claims.

Referring to the accompanying sheet of drawings, which form a part of this specification, Figure 1 is a view in elevation of a complete needle-holder embodying the principle of my invention. Figs. 2, 3, and 4 are respectively enlarged side elevation, plan, and end views of the jaws of the same. Figs. 5, 6, and 7 are similar enlarged views of a modified form. Fig. 8 is an enlarged perspective view of the lower jaw of said modified form. Fig. 9 is a side elevation of a further modification styled a "universal holder." Fig. 10 is a plan of the lower jaw of Fig. 9. Fig. 11 is a plan of the upper jaw, and Fig. 12 is an end view of Fig. 9 in closed position.

It will be observed from Fig. 1 that the holder is comprised of the usual spring-handles 1 and 2, hinged or pivoted together, so as to be readily separable in the usual manner, and provided with a suitable spring and locking mechanism, as is customary in apparatus of this type.

My invention has no concern with the style of separable joint, nor with the form or construction of the spring or lock, and further description of the same will therefore be unnecessary, it being understood that other forms of joints and styles of handle may be substituted for the one shown, according to the option of the manufacturer or the fancy of the user, without in any way departing from the spirit and scope of my invention. It is desirable, however, that the handles be provided with suitable means for limiting their opening movement while in action, which is conveniently and usually effected by confining the play of the spring.

The principle of the clamping action of my improved holder is that of the inclined plane or wedge so arranged that the larger component of the pressure acting to clamp and hold the needle is exerted in a direction substantially coincident with the longitudinal axes of the jaws and is taken up as compression and extension strain in these members rather than in lateral or bending strains, such as occur in holders of the forceps type. By thus disposing of the greater part of the strain it is obvious that the two jaws may be made with very small cross-sectional area and the needle may be held almost at the very tip of the instrument in unobstructed view of the operator. The lower clamping member or jaw 3 is formed at its end with an upwardly-projecting lip 4, the inner or rear face of which constitutes a thrust or bearing surface against which the needle is adapted to be clamped. The corresponding end of the upper member or jaw 5 is formed with a clamping-surface 6, the latter being eccentric to its pivot or inclined to its own path of movement, so that as the jaws close together the space between the two clamping-surfaces is gradually narrowed, and a needle placed in the seat between them will be securely clamped with a pressure dependent upon the eccentricity of the surface 6 and the pressure applied to the handles; but the strain of this pressure in the jaws is mostly endwise, as above explained. The two jaws, which are of unequal length, as shown, are pivoted together with their respective thrust and wedging surfaces so disposed as to be intersected by the plane which is common to both of their longitudinal axes, and, moreover, the direction of the relative movement of the two clamping-surfaces lies in the plane which is determined by the angle between the said lip and jaw or by the respective axes of said lip and jaw. The needle-seat extends in a direction transverse to the plane of movement of the jaws and handles, thereby enabling the instrument to be used with the greatest facility and in the manner of the ordinary forceps, and the thrust-bearing surface is finished so as to be straight in the direction of the axis of the seat, as is also the inclined clamping-surface, so that that portion of the needle which is between the clamping-surfaces is clamped with substantially uniform pressure at all points without setting up distorting or bending strains, the needle being held in its seat with its top side exposed and free from pressure. While both of the clamping-surfaces are arranged transverse to the general plane of the proximate faces of the clamping members, it is not necessary that either be perpendicular thereto, nor that the two surfaces be parallel when the jaws are in closed position. A very practical angle for the thrust-surface is one slightly inclined from ninety degrees toward the needle-seat, so that its upper edge will be nearest the inclined or eccentric surface, as this prevents the needle sticking to the latter when the jaws are opened. The lower jaw is provided with a cavity or slot 7 adjacent the transverse surface to provide clearance for the end of the clamping-surface and permit the latter to descend far enough to bear firmly against the narrowest-size needles, excess of pressure, as with larger needles, being of course taken up in the resiliency of the spring-handles 1 and 2 in the usual manner.

The modified form shown in Figs. 5, 6, and 7 is a reversal of the construction just described in that the directions of the strains in the two jaws are reversed. The lower member 8 is rabbeted at its end, as shown more plainly in Fig. 8, and the surface 9 constitutes the thrust or bearing surface for the needle, while the portion 10 forms the bottom of the needle-seat. The upper member 11 is substantially the same shape as in Fig. 2; but the inclined or eccentric surface 12 is on the rear side of its hook-shaped end in such relation to the thrust-surface 9 that it serves to clamp the needle, as in the manner above described. The end of the portion 10 is slotted analogously to the cavity or aperture 7 to provide clearance for the wedging or clamping portion of the other jaw. In both forms, however, a small ledge is left intact between the cavity and the adjacent surface, which acts as a support for the needle to prevent it from following the wedging-surface, and thereby becoming subjected to unusual lateral strain or becoming distorted or broken.

It will be observed that in both of the above-described forms the upper jaw is thinner than the lower jaw, being tapered laterally toward its tip, so that it may enter the clearance-aperture when the jaws are in closed position, and also that the end of the upper jaw adjacent the overlapping portion of the lower jaw is deeper in the direction of its movement than its central portion or the part intermediate of its ends, which might be designated the "shank of the jaw," this shape and relative dimensions being a point of importance in my invention in that it combines requisite strength with unobstructed view of the needle or its seat.

The modified form of Figs. 9, 10, 11, and 12 represents a universal holder adapted to hold needles at different angles with the axis of the instrument, but nevertheless in positions transverse to the plane of movement of the jaws and handles. The principle of the wedge is also present in the action of this form; but the directions of the strains are not all substantially coincident with the axes of the clamping members. The lower member 14 is provided with a transverse thrust-surface 15 and two diagonal thrust-surfaces 16 and 17, formed by the three intersecting channels, as shown in Fig. 10, thus providing three distinct needle-seats of different directions. The upper jaw 18 is provided with a post or wedge-like projection adapted to enter the aperture 19 in the lower jaw when moved toward the clamping or closed position, and the sides of the post adjacent to the three thrust-surfaces are slightly flattened, Fig. 11, but are nevertheless slightly eccentric to the path of their movement, so that a needle in any of the three seats will be firmly clamped in the manner heretofore described. The aperture 19 extends close to the thrust-surfaces, leaving, however, a slight ledge adjacent each of them, which is similar to the ledge 13, above described, and serves the same purpose. Obviously the strains in the jaws when holding a needle in one of the diagonal seats are not strictly in the direction of the axis of the jaws, but they are taken up for the most part in the post and the opposite side of the aperture and little, if any, appears as transverse or bending strain in the jaw members.

In all of the above forms it will be observed that small crevices and corners liable to catch septic matter are avoided. The apertures allowing clearance for the clamping-surfaces extend entirely through the members and are consequently capable of easy and thorough sterilization.

I claim—

1. In a surgical-needle holder, a jaw provided with a thrust-surface disposed transversely thereof, a second jaw pivoted to the first and having an eccentric surface movable edgewise toward the thrust-surface so as to narrow the space between them, in combination with a needle-seat transverse to the movement of said surfaces and a bottom for said seat for supporting the needle against distorting lateral strains.

2. In a needle-holder, a pair of jaws, one of said jaws having a wedge-surface and the other a corresponding thrust-surface, in combination with a needle-seat between said surfaces and a bottom for said seat supporting the needle against movement with said wedge-surface.

3. In a needle-holder, a pair of jaws, one of said jaws having a wedge-surface and the other having a corresponding thrust-surface, a cavity adjacent one of said surfaces affording clearance for the other and a needle-seat between the surfaces.

4. In a needle-holder, a pair of jaws relatively movable toward and from each other in a common plane, one of said jaws having a wedge-surface and the other having a corresponding thrust-surface, the said surfaces being intersected by the common plane, and a needle-seat between the surfaces.

5. In a needle-holder, a pair of relatively movable jaws, projections from the proximate faces thereof, one of said projections having a side slightly inclined to the direction of said relative movement and acting as a wedge, in combination with a needle-seat between said inclined side and the other projection.

6. In a needle-holder, a pair of relatively movable jaws, one of said jaws having a wedging-surface extending toward the other jaw and the other jaw having a thrust-surface cooperating with said wedging-surface and a needle-seat having a bottom side supporting the needle, said needle-seat being open on the side opposite its bottom to expose the top of the needle.

7. In a needle-holder, a pair of pivoted jaws having formed thereon respectively a wedging and a cooperating thrust-surface, a needle-seat between said surfaces wherein the needle is held parallel with the proximate faces of said jaws with its top surface exposed and free from pressure.

8. In a surgical-needle holder, a pair of clamping members arranged to have movement toward and from each other and provided respectively with a thrust and a wedge-surface, said surfaces being disposed transversely to the proximate faces of said movable members, an aperture in the member having the thrust-surface, adapted to receive said wedge-surface and a needle-seat between said surfaces parallel to said proximate faces.

9. In a needle-holder, a pair of jaws provided respectively with clamping-surfaces movable edgewise toward each other to narrow the space between them, a cavity in one jaw adjacent the clamping-surface thereof to provide clearance for the other surface, and a ledge between said cavity and its adjacent surface providing a support for the needle against distorting strains.

10. In a needle-holder, a jaw with a wedging-surface and a jaw with a cooperating thrust-surface, said surfaces being adapted to clamp a needle between them with the top side of said needle exposed and free from pressure, one of said jaws having an aperture adjacent its clamping-surface affording clearance for the other surface, and a ledge between said aperture and its adjacent surface to support the needle against distorting strains.

11. In a surgical-needle holder, a pair of pivoted jaws provided respectively with a thrust-surface and an eccentric clamping-surface, the latter acting as a wedge with respect to said thrust-surface, and the said thrust-surface being inclined from the direction of the relative movement of the jaws with its upper edge nearest the eccentric surface when the jaws are in closed position, substantially as described.

12. In a needle-holder, a pivoted jaw having a thrust-surface transverse to the inner face thereof and disposed at an acute angle with the longitudinal or radial axis thereof, in combination with a needle-seat in said angle and a second jaw having a wedging-surface transverse to its inner face and disposed on the opposite side of said needle-seat.

13. In a needle-holder, a jaw with a projecting lip formed thereon at an angle to the longitudinal axis thereof and provided with a thrust-surface on said lip, in combination with a second jaw provided with a wedge-surface cooperating with said thrust-surface and movable relatively toward the same in the plane of the angle formed by the lip and the said axis of the jaw, and a needle-seat between said two surfaces.

14. In a needle-holder, the combination of a jaw having a lip formed at an angle to the axis thereof and a thrust-surface provided by said lip, a second jaw provided with a wedge-surface complementary to said thrust-surface and movable relatively toward the same in the plane of the said angle of lip and axis, a cavity adjacent one of said surfaces and a support for a needle between said surface and cavity.

15. In a needle-holder, a pair of jaws of unequal length pivoted to swing toward and from each other, a lip formed on the end of the longer jaw overlapping the end of the other jaw, clamping-surfaces respectively on said lip and jaw end, and a needle-seat between said surfaces.

16. In a needle-holder, a jaw provided with a clamping-surface transverse to its inner side and a slot therein adjacent said surface, a second jaw tapered, as to its lateral dimension, toward its forward end to fit said slot and pivoted to said first-mentioned jaw, the dimension of said second jaw in the direction of its movement being greater at its forward end than at its central portion, and a needle-seat adjacent said clamping-surface.

17. A needle-holder comprising pivoted jaws, a thrust-surface on one of them transverse to its inner face and forming an acute angle therewith, a cavity adjacent said surface and a supporting-ledge between the same and said cavity, in combination with a wedging-surface on the other jaw transverse to its inner face and having clearance in said cavity, and a needle-seat between said two surfaces, the several parts being arranged to clamp a needle therein with pressure exerted substantially in the direction of the axes of said jaws, substantially as described.

18. A surgical-needle holder, comprising a pair of swinging jaws provided with a plurality of clamping-surfaces arranged transverse to the proximate faces thereof forming needle-seats of different directions, the surfaces on one of said jaws being in the form of intersecting slots and the surfaces on the other being disposed on a projection, an aperture between said slots to receive said projection.

In testimony whereof I have signed my name to the specification in the presence of two subscribing witnesses.

GUSTAV F. RICHTER.

Witnesses:
H. G. KIMBALL,
G. A. TAYLOR.